Jan. 3, 1967  E. A. WHATELEY  3,295,394
PLANETARY TORQUE-TRANSMITTING GEARING
Filed Oct. 21, 1963  4 Sheets-Sheet 1

United States Patent Office 3,295,394
Patented Jan. 3, 1967

3,295,394
PLANETARY TORQUE-TRANSMITTING GEARING
Eric A. Whateley, Coventry, England, assignor to Axel Wickman Transmissions Limited, Coventry, England
Filed Oct. 21, 1963, Ser. No. 317,652
Claims priority, application Great Britain, Oct. 29, 1962, 40,712/62
7 Claims. (Cl. 74—781)

The invention relates to a planetary torque-transmitting gearing of the kind which is adapted to be operated optionally for transmitting torque either at unit or at the planetary ratio, and includes an axially-movable friction engaging member adapted to engage a first coacting friction surface for providing one of the ratios or to engage a second coacting friction surface for providing the other ratio, a biasing means for urging the axially-movable friction engaging member into engagement with the first coacting friction surface, and a force-producing means actuable to disengage the axially-movable friction engaging member from the first coacting friction surface and to engage the axially-movable friction engaging member with the second coacting friction surface. In particular, but not exclusively, the invention relates to such a gearing for use as an overdrive, or an underdrive in the power transmission system of a motor road vehicle.

With a planetary gearing, of the kind set forth, in which the biasing means is a spring means, the engagement of the ratio actuated by the biasing means is of a desirable yielding character, whereas the engagement of the other ratio by the force-producing means can give rise to an undesirable shock in the transmission. This shock tends to occur particularly in the case where the force-producing means is a piston and cylinder arrangement operated by pressurised liquid.

An object of the invention is to provide a planetary gearing, of the kind specified, in which the force-producing means can engage its ratio without generating an undesirable shock.

According to the invention a planetary torque-transmitting gearing is adapted to be operated optionally for transmitting torque either at unit or at the planetary ratio, and includes an axially-movable friction engaging member adapted to engage a first coacting friction surface for providing one of the ratios or to engage a second coacting friction surface for providing the other ratio, a first resiliently-distortable means for urging the axially-movable friction engaging member into engagement with the first coacting friction surface, a force-producing means actuable to disengage the axially-movable friction engaging member from the first coacting friction surface and to engage the axially-movable friction engaging member with the second coacting friction surface through a second resiliently-distortable means.

Preferably, and according to a feature of the invention, the lower of the two ratios is provided by the first resiliently-distortable means causing the movable friction engaging member to engage the first coacting friction surface and the higher of the two ratios is provided by the force-producing means loading the second resiliently-distortable means and causing the friction engaging member to engage the second coacting friction surface.

According to a further feature, the movable friction engaging member includes a hollow, truncated-conical annulus adapted, when moved in one axial direction, for its inner periphery to engage a convexly conical coacting friction surface for selecting one of the ratios, and, when moved in the opposite direction out of engagement with the convexly conical friction surface, for its outer periphery to engage a concavely conical coacting friction surface for providing the other ratio.

According to another feature, the force-producing means is a liquid-operated piston adapted to compress the second resiliently-distortable means to load an abutment adapted to act on the movable friction engaging member.

According to yet another feature, the movable friction engaging member has a radial flange of which one axial side is arranged to be acted upon by the first resiliently-distortable means for effecting engagement between the movable friction engaging member and the first coacting friction surface, and of which the other axial side is arranged to be acted upon by the second resiliently-distortable means, when loaded by the force-producing means, for effecting engagement between the movable friction engaging member and the second coacting friction surface.

The invention is illustrated, by the way of example only, in the accompanying drawings, in which.

Figure 1:
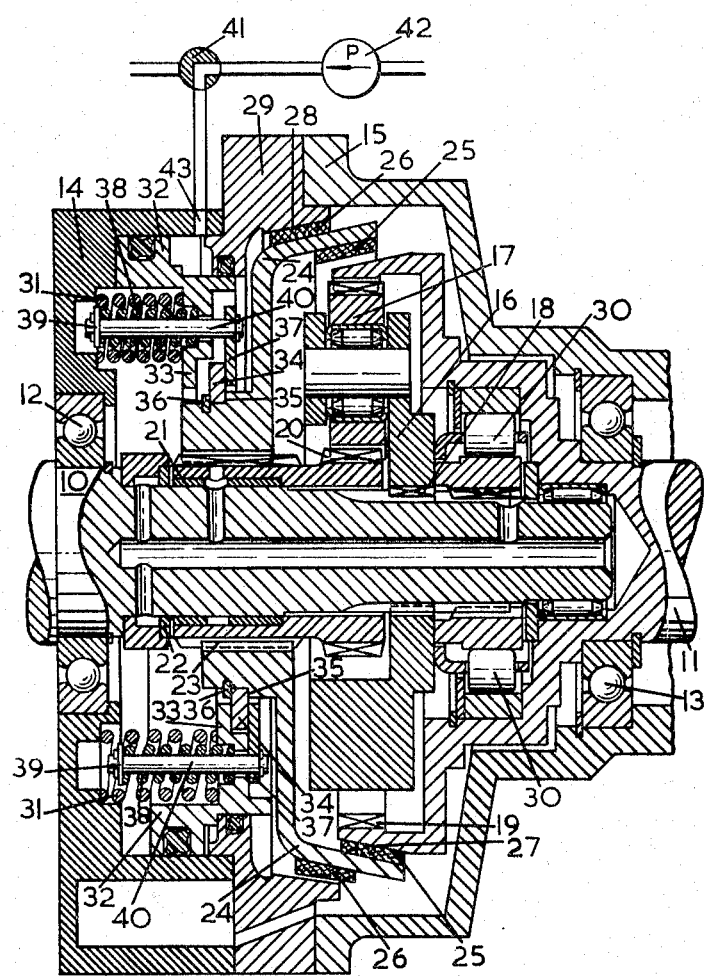
FIGURE 1 is a diagrammatic longitudinal section through a planetary torque-transmitting gearing provided with one embodiment of the invention, the upper portion of the figure showing the planetray ratio engaged, and the lower portion showing unit ratio engaged.

In FIGURE 1, an input shaft 10 and an aligned output shaft 11 are journalled in bearings 12, 13 carried by casing members 14 and 15. A carrier 16 for a planet wheel 17 is held rotatively fast by splines 18 with the input shaft 10, an annulus gear wheel 19 is formed integral with the output shaft 11, and a sun gear wheel 20 is journaled at 21 on the input shaft 10 but is axially located by a thrust washer 22 and has a splined connection 23 with a movable friction engaging member 24 carrying frusto-conical friction pads 25 and 26. As illustrated in the lower portion of FIGURE 1, the friction engaging member 24 can be slid axially in one direction on the splines 23 of the sun gear for the surface of the inner friction pad 25 to engage over a complementary clutch surface 27 of the annulus gear wheel 19, whereby to lock the sun gear 20 to the annulus gear 19 so as to inhibit the planetary motion and to provide drive transmission at unit ratio. As illustrated in the upper portion of FIGURE 1, the friction engaging member 24 can be slid in the opposite axial direction for the surface of the outer friction pad 26 to engage in a complementary brake surface 28 of brake ring 29 which is fast with the casing members 14 and 15 and thereby holds the sun gear wheel 20 stationary for the drive to be transmitted through the gearing at the planetary ratio. A one-way clutch 30 of conventional construction may be arranged between the input shaft 10 and the output shaft 11 to prevent the latter from rotating slower than the input shaft.

A plurality of axially-directed compression springs 31, of which only two are shown, are arranged in a circle about the common axis of the input and output shafts and react between the casing member 14 and an annular piston 32. As will be seen from the lower portion of FIGURE 1, an inwardly-directed flange 33 of piston 32 normally bears on the movable friction engaging member 24 through a radial flange 34 axially secured to the movable friction engaging member 24 by shoulder 35 and circlip 36, to cause engagement of unit ratio.

The piston 32 is resiliently connected to an abutment 37 through a plurality of axially-directed compression springs 38 which are arranged inside the springs 31 and react on the abutment 37 through respective collars 39 and respective rods 40. When a valve 41 is actuated to the position shown, pressurised liquid is supplied from a pump 42 to a port 43 and the piston 32 is moved, against the bias of springs 31, to the position shown in the upper portion of FIGURE 1. This movement of the piston 32 first causes inwardly-directed flange 33 to be withdrawn from radial flange 34, whereby to relieve the movable friction engaging member 24 of the bias of springs 31 and disengage unit ratio, and subsequently causes abutment 37 to apply the bias of springs 38 to the radial flange 34 of the movable friction engaging member 24 to engage the planetary ratio. The maximum force that the springs 38 can apply to the movable friction engaging member 24 is dependent on the travel of the annular piston 32. Thus, if the net force exerted on the piston 32 by the pressurised liquid is greater than the net force exerted by the springs 31 and 38 when compressed to a condition corresponding with the full travel of the piston 32, the excess force exerted by the piston 32 will be resisted by the casing member 14 and will not be applied to the movable friction engaging member 24.

Figure 2:
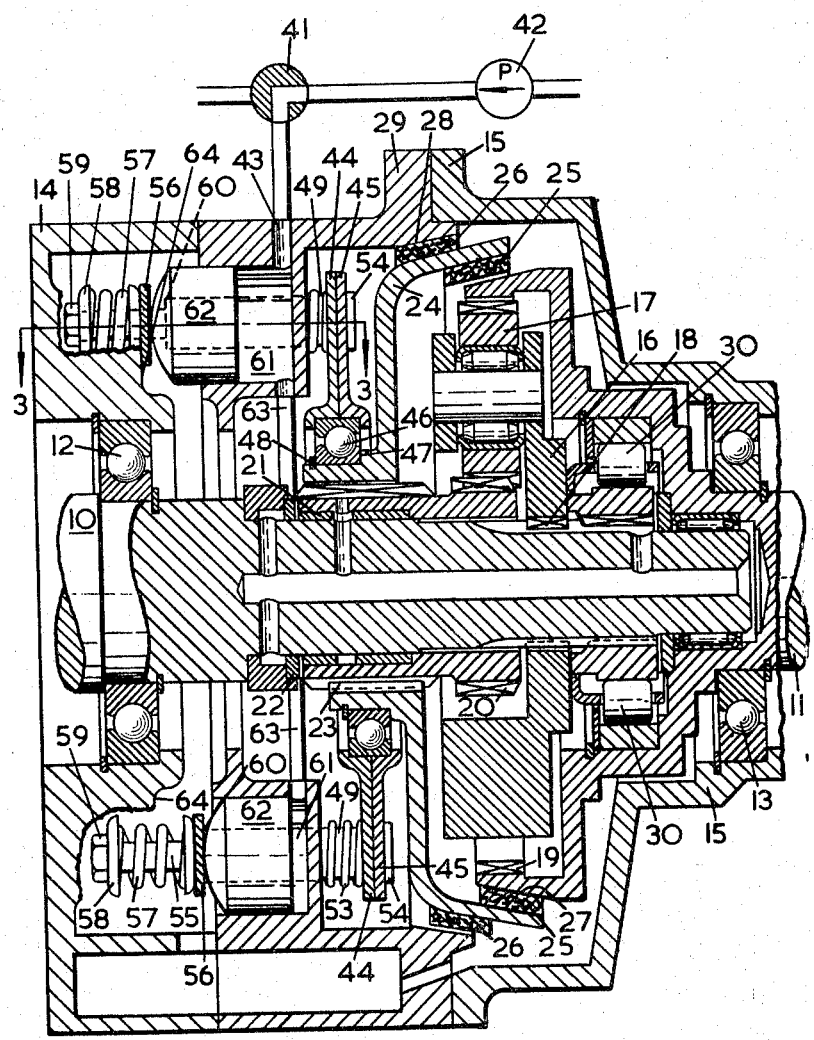
FIGURE 2 is a diagrammatic longitudinal section, as if taken on the line 2—2 of FIGURE 3, through a planetary torque-transmitting gearing similar to that illustrated by FIGURE 1, but provided with another embodiment of the invention.
Figure 3:
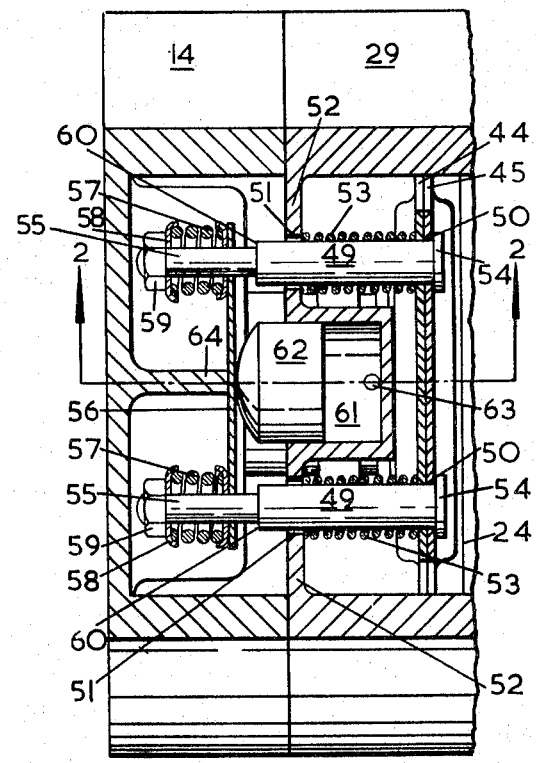
FIGURE 3 is a section taken on the line 3—3 of FIGURE 2.

The embodiment illustrated by FIGURES 2 and 3 is applied to the same basic planetary gear train that has been described with reference to FIGURE 1. Accordingly, corresponding parts have been identified by the same reference numerals and may be considered as performing the same functions.

In FIGURES 2 and 3, the movable friction engaging member 24 is held axially fast with a rotationally-stationary, two-part, radial flange 44, 45 by a bearing 46 which is located on the friction engaging member 24 by a shoulder 47 and a circlip 48. Four studs 49, of which only three are shown, extend through axially-directed holes 50 in the radial flange 44, 45 and through axially-directed holes 51 in an inwardly-directed, annular flange 52 integral with brake ring 29. Compression coil springs 53 are arranged around the studs 49 and react between the flange 52 and part 44 of the radial flange, whereby to urge inner clutch pad 25 into engagement with the complementary clutch surface 27 of the annulus gear wheel 19 to provide drive transmission at unit ratio as illustrated in the lower portion of FIGURE 2.

Each stud 49 is formed at one end with a head 54, for abutting part 45 of the radial flange, and at the opposite end with a coaxial extension 55 of smaller diameter. The four studs 49 are arranged in two pairs and the studs of each pair have a strap 56 slidably interconnecting their extensions 55. Compression coil springs 57 are arranged around the extensions 55 of each stud 49 and react between their respective strap 56 and abutments 58 held fast with the ends of the extensions 55 by nuts 59.

When unit ratio is engaged, as illustrated in the lower portion of FIGURE 2, the springs 57 urge the straps 56 into engagement with shoulders 60 which are formed by the change of cross-section between extensions 55 and studs 49. Under these conditions the springs 57 have no effect on the movable friction engaging member 24 which is urged into engagement with the annulus gear wheel 19 solely by the action of springs 53.

The annular flange 52 is formed with two cylinders 61 for respective pistons 62 which are arranged to act on the straps 56 in between each pair of studs 49. Thus, when valve 41 is actuated to the position shown, pressurised liquid is supplied from pump 42 to port 43 and the pistons 62 are moved to the left as indicated in the upper portion of FIGURE 2, the cylinders 61 being interconnected by a duct 63.

The force exerted by the pistons 62 on the straps 56 causes the springs 57 to apply a corresponding force to the abutments 58 and thus through the extensions 55, studs 49 and heads 54 to the radial flange 44, 45. The force applied by the heads 54 to the flange 44, 45 acts in opposition to the force exerted by the springs 53, and it will be appreciated that the resultant of these forces is transmitted by the flange 44, 45 to the movable friction engaging member 24. Thus, as the force exerted by the pistons 62 increases, the force of engagement of unit ratio will decrease to zero at which point the movable friction engaging member 24 will move to the left to engage the planetary ratio, further increase of the force exerted by the pistons 62 causing the force of engagement of the planetary ratio to be increased.

It is important to limit the maximum force of engagement of both unit and planetary ratios. As will be appreciated, the force of engagement of unit ratio is determined solely by the springs 53 and can be readily controlled. However, the force of engagement of the planetary ratio is dependent on the force exerted by the pistons 62, and this force is in turn dependent on the pressure of the fluid supplied by the pump 42. In the case of a motor road vehicle, the pump 42 will most probably be driven at a speed commensurate with road speed and, if the pump is capable of producing fluid pressures adequate for holding the planetary ratio engaged at moderate road speeds, it will most probably produce excessive fluid pressures at higher road speeds. In order to prevent the force of engagement of planetary ratio from being excessive, the axial movement of the pistons 62 and straps 56 is limited, as will best be seen from FIGURE 3, by stops 64 formed integral with casing member 14. Accordingly it will be appreciated that the maximum force of engagement of planetary ratio will be limited by the maximum travel of the piston and by the rating of springs 57, and will be independent of the fluid pressure supplied by pump 42.

In order to keep the travel of the pistons 62 as short as possible, the springs 57 are preferably pre-loaded to a value equal to the maximum force that the springs 53 can exert on the movable friction engaging member 24. If this is done, the springs 57 will not be compressed by the piston 62 until after unit ratio is disengaged.

Figure 4:
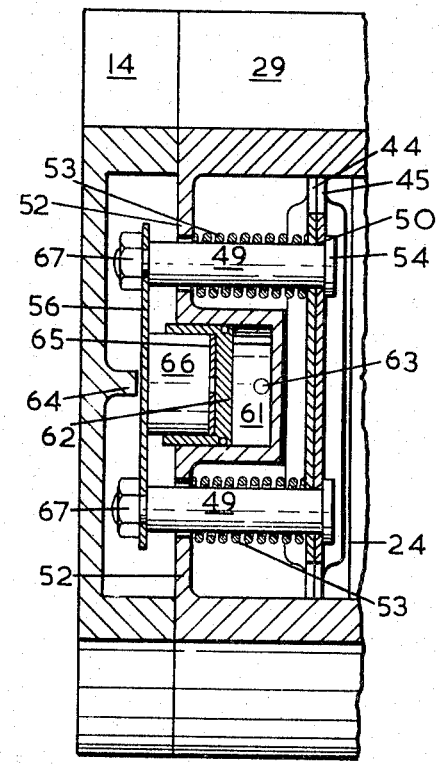
FIGURE 4 is a section similar to FIGURE 3 but provided with a further embodiment of the invention.
Figure 5:
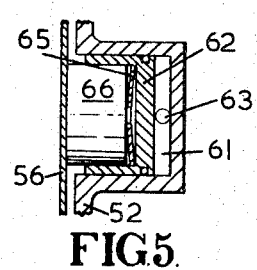
FIGURE 5 is a scrap view taken from FIGURE 4.

The embodiment illustrated by FIGURES 4 and 5 is, to a large extent, similar to the arrangement illustrated in FIGURES 2 and 3. The flange 44, 45 is urged by springs 53 to cause movable friction engaging member 24 to engage unit ratio, and pistons 62 are arranged to act on flange 44, 45 through heads 54, studs 49 and straps 56 to cause movable friction engaging member 24 to disengage unit ratio and then engage the planetary ratio. However, the arrangement illustrated by FIGURES 4 and 5 differs from that illustrated by FIGURES 2 and 3 in that each piston 62 is arranged to act on strap 56 through a frusto-conical spring washer 65 and a telescopic nose 66, and each strap 56 is held axially-fast with its respective pair of studs 49 by nuts 67.

FIGURE 5 shows the piston 62 of FIGURE 4 in its inoperative position with no pressure in cylinder 61 and with the spring washer 65 in its relaxed condition so that springs 53 cause the engagement of unit ratio. When fluid pressure is applied to piston 62 the force generated by the piston 62 is applied to the studs 49 through spring washer 65 whose deflection serves to reduce the rate of increase of the force so that the shock of engagement will be eliminated. In this embodiment the stop 64 serves to limit the axial travel of the strap 56 and associated components when considerable wear of the outer friction pad 26 has occurred. The main advantage of using the spring washer 65 is a saving in the axial length of the gearing as will be seen by comparing the thickness of casing 14 in FIGURES 3 and 4. If necessary a series of spring washers 65 may be arranged between the piston 62 and the telescopic nose 66 in order to give a higher degree of resilience between the movement of the piston 62 and the movement of the friction engaging member 24.

Although the invention has been specifically described with reference to an overdrive it can also be applied to an underdrive. Thus, if shaft 11 were made the input shaft and shaft 10 the output shaft, the planetary ratio would provide an underdrive.

While, in the examples given, the force-producing means is a piston and cylinder arrangement operated by pressurised liquid, it will readily be understood that the benefit of the invention will still be obtained if piston 31, or piston 62, as appropriate, are operated upon mechanically, or electro-magnetically for causing the gear ratio to be changed.

The one-way clutch 30 is not an essential feature of the invention although it may be employed as illustrated for preventing uncontrolled acceleration of the input shaft 10, whilst the friction engaging member 24 is not engaging either clutch surface 27 or brake surface 28 during a power gear change from the planetary overdrive ratio to the unit ratio.

The particular arrangement of friction pads 25 and 26 and clutch surfaces 27 and brake surface 28 is also not an essential feature of this invention. If desired other arrangements of friction pads and clutch and brake surfaces may be used provided that a resiliently-distortable means, such as spring 38 or 57 or spring washer 65, is arranged operatively between the force-producing means and the friction engaging member. For example, the arrangement of friction pads and clutch and brake surfaces illustrated in our United States patent application No. 279,281, now Patent No. 3,164,036, may be employed, the force producing piston being formed in two parts separated by a spring washer as taught by FIGURES 4 and 5 of this specification.

What I claim as my invention and desire to secure by Letters Patent of the United States is:

1. A planetary torque-transmitting gearing including a friction engaging member, means supporting said friction engaging member for axial movement, a member defining a first friction surface, said friction engaging member movable axially to engage said first friction surface, said planetary gearing arranged to transmit torque at one ratio when said friction engaging member is engaged with said first friction surface, a member defining a second friction surface, said friction engaging member movable axially away from said first friction surface to engage said second friction surface, said planetary gearing arranged to transmit torque at another ratio when said friction engaging member is engaged with said second friction surface, a first resiliently-distortable means arranged to urge said friction engaging member axially into engagement with said first friction surface, a force-producing means, a second resiliently-distortable means arranged operatively between said force-producing means and said friction engaging member, and said force-producing means operable to load said second resiliently-distortable means to urge said friction engaging member axially away from said first friction surface and into engagement with said second friction surface whereby said second resiliently-distortable means will prevent the generation of a shock in said gearing when said force-producing means is operated to engage said another ratio.

2. A planetary torque-transmitting gearing including a friction engaging member, means supporting said friction engaging member for axial movement, a member defining a first friction surface, said friction engaging member movable axially to engage said first friction surface, said planetary gearing arranged to transmit torque at one ratio when said friction engaging member is engaged with said first friction surface, a member defining a second friction surface, said friction engaging member movable axially away from said first friction surface to engage said second friction surface, said planetary gearing arranged to transmit torque at another ratio when said friction engaging member is engaged with said second friction surface, a first resiliently-distortable means arranged to urge said friction engaging member axially into engagement with said first friction surface, an abutment arranged to move said friction engaging member axially into engagement with said first friction surface, a force-producing means, a second resiliently-distortable means arranged operatively between said force-producing means and said abutment, and said force-producing means operable to load said abutment through said second resiliently-distortable means to urge said friction engaging member axially away from said first friction surface and into engagement with said second friction surface whereby said second resiliently-distortable means will prevent the generation of a shock in said gearing when said force-producing means is operated to engage said another ratio.

3. A planetary torque-transmitting gearing including a friction engaging member, means supporting said friction engaging member for axial movement, a member defining a first friction surface, said friction engaging member movable axially to engage said first friction surface, said planetary gearing arranged to transmit torque at one ratio when said friction engaging member is engaged with said first friction surface, a member defining a second friction surface, said friction engaging member movable axially away from said first friction surface to engage said second friction surface, said planetary gearing arranged to transmit torque at another ratio when said friction engaging member is engaged with said second friction surface, a radial flange axially secured to said friction engaging member, a first resiliently-distortable means arranged to act on one axial side of said radial flange thereby to urge said friction engaging member axially into engagement with said first friction surface, a force-producing means arranged to act on the other axial side of said radial flange, a second resiliently-distortable means arranged operatively between said force-producing means and said other axial side of said radial flange, and said force-producing means operable to load said other axial side of said radial flange through said second resiliently-distortable means thereby to urge said friction engaging member axially away from said first friction surface and into engagement with said second friction surface whereby said second resiliently-distortable means will prevent the generation of a shock in said gearing when said force-producing means is operated to engage said another ratio.

4. A planetary torque-transmitting gearing including an input shaft, an output shaft, a casing, said shafts supported for rotation in said casing, a sun gear wheel, an annulus gear wheel, a planet pinion, a planet carrier supporting said planet pinion in mesh with said gear wheels, said planet carrier drivingly secured to one of said shafts, one of said gear wheels drivingly secured to the other of said shafts, a friction engaging member, means supporting said friction engaging member for axial movement, the other of said gear wheels drivingly secured to said friction engaging member, a first member defining a first friction surface, said first member rotatively fast with said one gear wheel, said friction engaging member movable axially to engage said first friction surface for said input shaft to transmit torque to said output shaft at unit ratio, a second member defining a second friction surface, said second member rotatively fast with said casing, said friction engaging member movable axially away from said first friction surface to engage said second friction surface for said input shaft to transmit torque to said output shaft at a planetary ratio, a first compression coil spring arranged operatively between said friction engaging member and said casing thereby to urge said friction engaging member axially into engagement with one of said friction surfaces, a force-producing means, a second compression coil spring arranged operatively between said force-producing means and said friction engaging member, and said force-producing means operable to load said second compression coil spring to urge said friction engaging member axially away from said one friction surface and into engagement with the other said friction surface whereby said second compression coil spring will prevent the generation of a shock in said gearing when said force-producing means is operated to engage said other friction surface.

5. A planetary torque-transmitting gearing including an input shaft, an output shaft, a casing, said shafts supported for rotation in said casing, a sun gear wheel, an annulus gear wheel, a planet pinion, a planet carrier supporting said planet pinion in mesh with said gear wheels, said planet carrier drivingly secured to one of said shafts, one of said gear wheels drivingly secured to the other of said shafts, a friction engaging member, means supporting said friction engaging member for axial movement, the other of said gear wheels drivingly secured to said friction engaging member, a first member defining a first friction surface, said first member rotatively fast with said one gear wheel, said friction engaging member movable axially to engage said first friction surface for said input shaft to transmit torque to said output shaft at unit ratio, a second member defining a second friction surface, said second member rotatively fast with said casing, said friction engaging member movable axially away from said first friction surface to engage said section friction surface for said input shaft to transmit torque to said output shaft at a planetary ratio, a radial flange axially secured to said friction engaging member, a first compression coil spring arranged operatively between said friction engaging member and said casing to act on one axial size of said radial flange thereby to urge said friction engaging member axially into engagement with one of said friction surfaces, a liquid pressure operated piston and cylinder means arranged to act on the other axial side of said radial flange, a second compression coil spring arranged operatively between said piston and cylinder means and said other axial side of said radial flange, and said piston and cylinder means operable to load said other axial side of said radial flange through said second compression coil spring thereby to urge said friction engaging member axially away from said one friction surface and into engagement with the other said friction surface whereby said second compression coil spring will prevent the generation of a shock in said gearing when said piston and cylinder means is operated to engage said other friction surface.

6. A planetary torque-transmitting gearing including an input shaft, an output shaft, a casing, said shafts supported for rotation in said casing, a sun gear wheel, an annulus gear wheel, a planet pinion, a planet carrier supporting said planet pinion in mesh with said gear wheels, said planet carrier drivingly secured to one of said shafts, one of said gear wheels drivingly secured to the other of said shafts, a friction engaging member, means supporting said friction engaging member for axial movement, the other of said gear wheels drivingly secured to said friction engaging member, a first member defining a first friction surface, said first member rotatively fast with said one gear wheel, said friction engaging member movable axially to engage said first friction surface for said input shaft to transmit torque to said output shaft at unit ratio, a second member defining a second friction surface, said second member rotatively fast with said casing, said friction engaging member movable axially away from said first friction surface to engage said second friction surface for said input shaft to transmit torque to said output shaft at a planetary ratio, a first resiliently-distortable means arranged operatively between said friction engaging member and said casing thereby to urge said friction engaging member axially into engagement with one of said friction surfaces, a force-producing means, a telescopic portion guided by said force-producing means, a second resiliently-distortable means arranged operatively between said force-producing means and said telescopic portion, said telescopic portion arranged to move said friction engaging member axially, and said force-producing means operable to load said telescopic portion through said second resiliently-distortable means to urge said friction engaging member axially away from said one friction surface and into engagement with the other said friction surface whereby said second resiliently-distortable means will prevent the generation of a shock in said gearing when said force-producing means is operated to engage said other friction surface.

7. A planetary torque-transmitting gearing including an input shaft, an output shaft, a casing, said shafts supported for rotation in said casing, a sun gear wheel, an annulus gear wheel, a planet pinion, a planet carrier supporting said planet pinion in mesh with said gear wheels, said planet carrier drivingly secured to one of said shafts, one of said gear wheels drivingly secured to the other of said shafts, a friction engaging member, means supporting said friction engaging member for axial movement, the other of said gear wheels drivingly secured to said friction engaging member, a first member defining a first friction surface, said first friction surface rotatively fast with said one gear wheel, said friction engaging member movable axially to engage said first friction surface for said input shaft to transmit torque to said output shaft at unit ratio, a second member defining a second friction surface, said second member rotatively fast with said casing, said friction engaging member movable axially away from said first friction surface to engage said second friction surface for said input shaft to transmit torque to said output shaft at a planetary ratio, a compression coil spring arranged operatively between said friction engaging member and said casing thereby to urge said friction engaging member axially into engagement with one of said friction surfaces, a liquid pressure operated piston and cylinder means, a telescopic portion guided by said piston, a frusto-conical spring washer arranged operatively between said piston and said telescopic portion, said telescopic portion arranged to move said friction engaging member axially, and said piston and cylinder means operable to load said telescopic portion through said spring washer to urge said friction engaging member axially away from said one friction surface and into engagement with the other said friction surface whereby said spring washer will prevent the generation of a shock in said gearing when said piston and cylinder means is operated to engage said other friction surface.

References Cited by the Examiner
UNITED STATES PATENTS

| | | | |
|---|---|---|---|
| 1,703,178 | 2/1929 | Sifton | 74—781 |
| 1,755,804 | 4/1930 | Barbarou. | |
| 2,540,965 | 2/1951 | Schellinger | 74—785 |
| 2,851,907 | 9/1958 | Normanville | 74—781 |

DAVID J. WILLIAMOWSKY, *Primary Examiner.*

T. C. PERRY, *Assistant Examiner.*